UNITED STATES PATENT OFFICE.

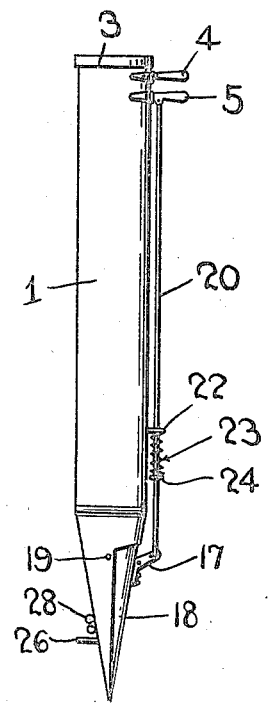
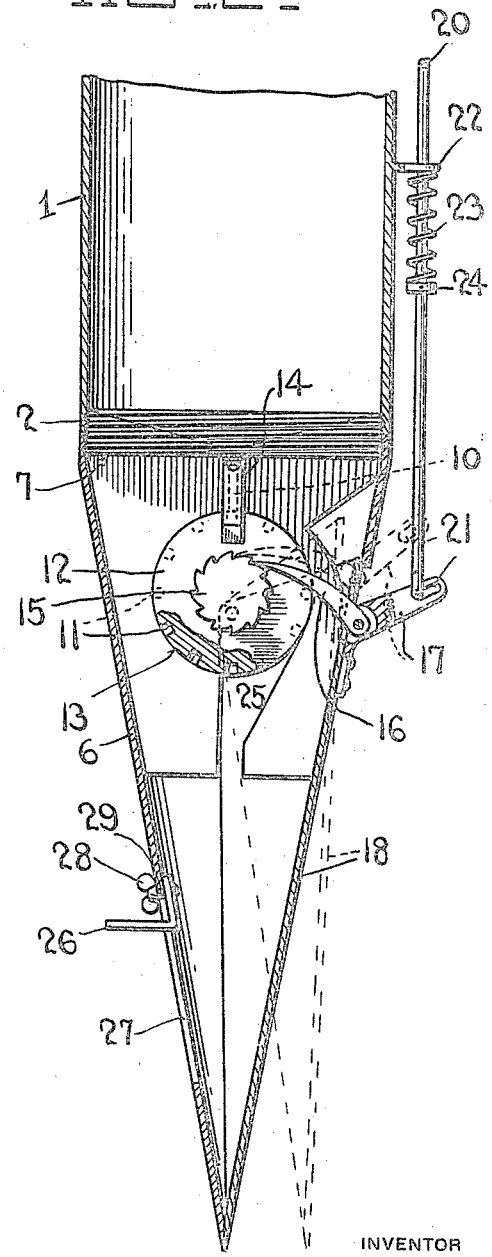
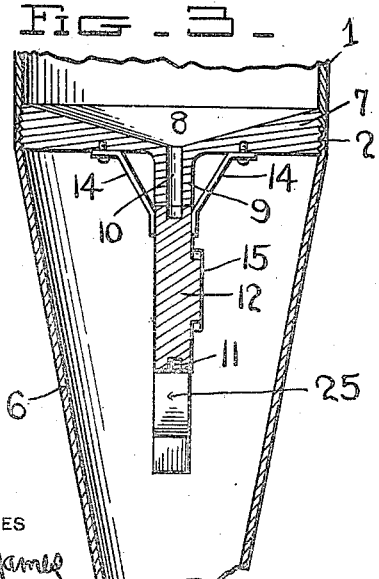

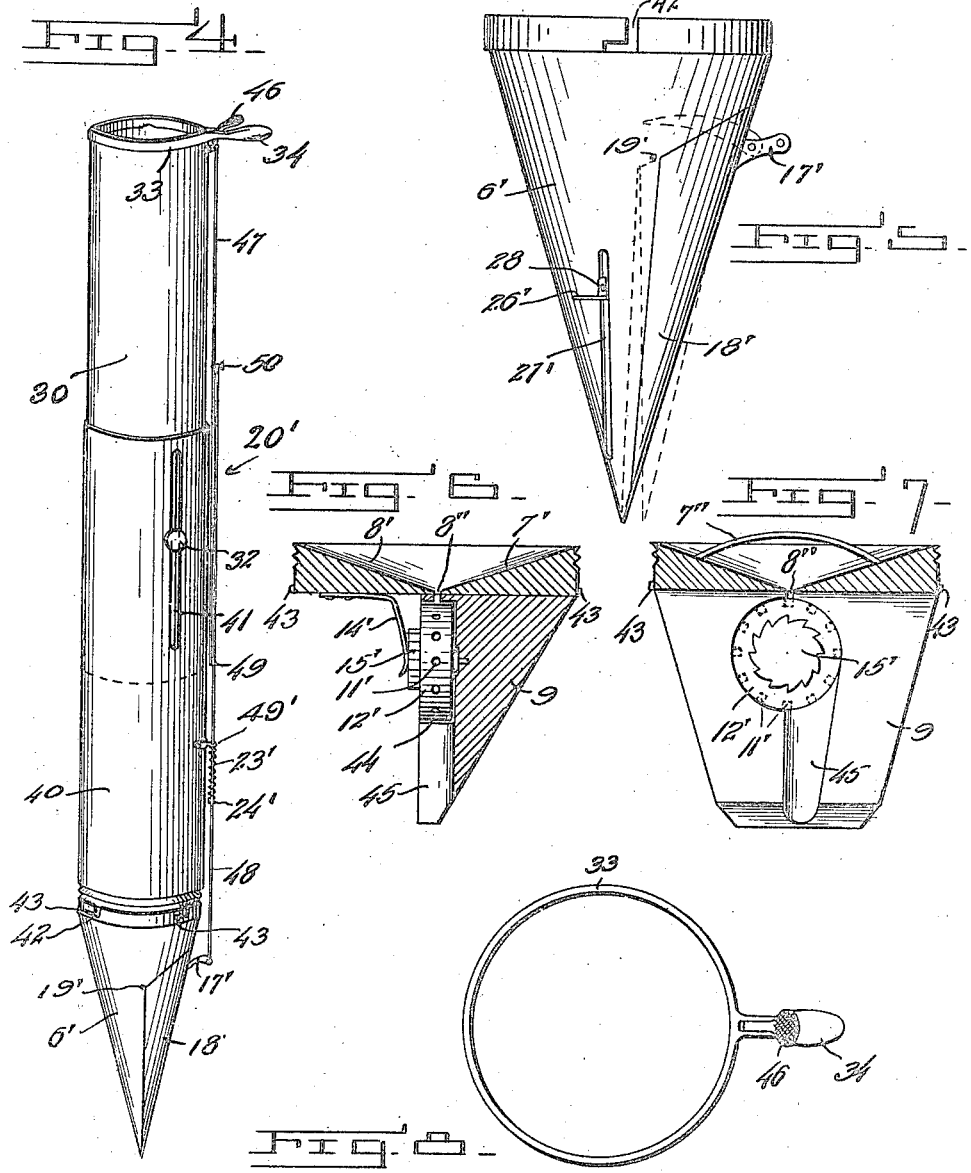

FRED MARTINSON, OF CHINOOK, MONTANA.

SEEDER.

1,253,621.  Specification of Letters Patent.  Patented Jan. 15, 1918.

Application filed June 11, 1917. Serial No. 174,079.

*To all whom it may concern:*

Be it known that I, FRED MARTINSON, a citizen of the United States, residing at Chinook, in the county of Blaine and State of Montana, have invented certain new and useful Improvements in Seeders, of which the following is a specification.

This invention relates to seeders and more particularly to hand operated garden seeders.

The main object of the invention is to provide a simply constructed, light, easily operated device of this character which may be easily carried and operated by one hand and by the use of which the seeds are dropped and planted in a single operation, and which may be adjusted to suit persons of different heights.

Another object is to provide a device of this character having means for regulating the depth at which the seed are to be planted, said means being adjustable to vary the planting depth.

Another object is to provide simple and efficient means for controlling and actuating the dropping mechanism.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a seeder constructed in accordance with this invention and shown in closed inoperative position, Fig. 2 is an enlarged vertical section through the seeder with the upper portion broken off, Fig. 3 is an enlarged detail vertical section taken in a plane at right angles to that of Fig. 2, Fig. 4 represents a side elevation of a seeder embodying this invention and showing a slightly different form from that illustrated in the figures above described, Fig. 5 is an enlarged side elevation of the earth penetrating member of the form shown in Fig. 4 detached, Fig. 6 is a detail transverse section thereof, Fig. 7 is a similar view taken in a plane at right angles to Fig. 6, and Fig. 8 is a top plan view.

In the embodiment illustrated in Figs. 1 to 3, the seeder constituting this invention comprises a seed container 1 here shown in the form of a cylinder composed of any suitable material preferably of sheet metal and which is internally threaded at its lower end as shown at 2 for a purpose to be described. A reinforcing band 3 is preferably arranged around the upper end of this container and a handle 4 is rigidly secured to said container adjacent said band and projects laterally therefrom. Another handle 5 is pivotally mounted on the receptacle below handle 4 and spaced vertically therefrom a sufficient distance to permit said handle 5 to move upwardly a predetermined distance without contacting with handle 4, its contact with said handle 4 limiting its upward movement.

An inverted cone-shaped seed discharge and earth penetrating member 6 is carried by the lower end of the receptacle 1, being internally threaded at its upper end and held in engagement with said receptacle by means of a horizontal partition or bottom 7 which has a threaded periphery engaged with the threaded lower portion of the container 1 and the threaded upper portion of the member 6 as is shown clearly in Figs. 2 and 3. This bottom 7 has a concave upper face 8 with a partition 9 made integral with its lower face and extending transversely across the upper end of the cone-shaped earth penetrating member 6 as is shown clearly in Fig. 2. This vertical partition 9 has a centrally disposed bore 10 opening through the center of bottom 7 and which is designed to register with a plurality of seed receiving pockets 11 formed in the periphery of a rotatably mounted seed distributing disk 12. This disk 12 is mounted to revolve in a correspondingly shaped opening 13 formed in the partition 9 as is shown clearly in Figs. 2 and 3, and is held in position in said opening by depending spring fingers 14 secured at one end to the lower face of bottom 7 and converging toward their free ends, said free ends being bent at an angle thereto and engaging the opposed faces of the distributing disk 13 as is shown clearly in Fig. 3. These spring fingers 14 frictionally engage said disk and operate as drags for controlling its rotary movement which is accomplished by means presently to be described.

A ratchet 15 is fixed to one face of the disk 12 being preferably cast integral therewith and is designed to be engaged by a pawl 16 carried by a laterally extending arm 17 mounted on the outer face of a pivoted section 18 of the cone shaped earth penetrating member 6 as is shown clearly in Fig. 2. This section 18 which is designed for discharging the seed dropped from disk 12 is pivotally mounted at its upper end as shown at 19 and is designed to be opened on the upward raising of arm 17 which is accomplished by means of a rod 20 connected with said arm at one end and at its other end with the pivotally mounted lever or handle 5 above referred to. This rod 20 extends through a longitudinally disposed slot 21 formed in the free end of the arm 17 as is shown clearly in Fig. 2 and is guided in an eye 22 which projects laterally from the cylinder 1 (see Figs. 1 and 2). A coiled spring 23 is carried by said rod between the lower face of eye 22 and a collar 24 adjustably mounted on said rod and exerts its tension to force said rod downwardly against arm 17 for closing section 18 of the planter.

The pivoted discharge section 18 of the inverted cone-shaped earth penetrating and seed distributing member extends around about one half of said member 6 as is shown clearly in Figs. 1 and 2 so that when said section is opened under the action of the raising of rod 20, as shown in dotted lines in Fig. 2, the seed dropped from one of the pockets 11 of the distributing disk 12 will pass through an outlet 25 formed in the partition 9 and be discharged into the opening formed in the earth by the insertion of the cone-shaped member 6.

Means are provided for regulating the depth to which said cone-shaped member 6 is to be inserted in the ground and is here shown in the form of an L-shaped stop such as 26 adjustably mounted in a slot 27 formed longitudinally in the wall of the member 6 which is opposed to that formed by the pivoted section 18. This stop 26 has one arm thereof extending laterally outward in a plane substantially at right angles to the longitudinal axis of the member 6 and is held in adjusted position in the slot 27 by means of a wing nut 28 which is carried by a bolt 29 on the short arm of the stop 26 and clampingly engages the wall of member 6 in which said slot 27 is formed. It will thus be seen that this stop 26 may be adjusted to position it at any desired point to provide for the greater or less insertion of the penetrating point of member 6 so that the seed may be planted at a greater or less depth according to the will of the operator.

In the use of this improved seeder, the cylinder 1 having been filled or partially filled with the seed to be planted, the operator grasps the handle 4 and inserts the point of the cone-shaped member 6 into the earth in which the seed are to be planted until the stop 26 thereof engages the surface of the earth and limits the downward movement of the planter. The operator then presses on the lever 5 moving it toward handle 4 which causes rod 20 to be elevated against the tension of its spring 23 thereby causing section 18 to swing outwardly on its pivot and pawl 16 to move inwardly a sufficient distance to turn the ratchet wheel 15 a single tooth which causes one of the pockets 11 to register with the discharge opening 25 in the partition 9 and drop therefrom the seed which was contained in said pocket. These seed then drop through the opening 25 and pass out of the lower end of the member 6 into the hole formed in the ground by said member. The operator then raises the device and the earth will close in over the seed and cover it. If found desirable, after the seed have been planted, a roller may be passed over the earth according to the size and character of the seed and the depth which they have been planted. When it is desired to plant the contents of two pockets 11 in a single hill or opening formed by the member 6, the lever 5 may be released after the first actuation thereof to cause the rod to be lowered and pawl 16 to pass into position for engaging another tooth of the ratchet 15 and when the lever 5 is again moved upwardly the operation above described will be repeated and the seed from the next pocket 11 will be discharged through opening 25 into the hole in the ground formed by the member 6.

In the embodiment illustrated in Figs. 4 to 8, the seeder comprises a cylindrical seed container which is composed of two telescopically engaged sections 30 and 40 to provide for the variation in the length of the container. the section 30 being here shown as the upper section and inserted within the lower section 40, although obviously this arrangement may be reversed if found desirable. Two studs project laterally from diametrically opposite points of the section 30 and extend through longitudinally disposed slots as 41 formed in the section 40 as is shown clearly in Fig. 4 to provide for the adjustment of the sections and to prevent turning of one section relatively to the other. These studs are threaded at their free ends and provided with knurled nuts 32 which operate to clamp the sections in adjusted position.

A band 33 is arranged around the upper end of section 30 and is preferably cast integral therewith, although not necessarily so, and has a handle 34 projecting laterally therefrom.

Detachably mounted on the lower end of the container section 40 is an inverted cone-shaped seed discharge and earth penetrating member 6', being connected with said section by bayonet joints, L-shaped slots 42 being shown arranged around the top of the member 6' and which are designed to interlockingly engage studs 43 projecting radially from a horizontal partition or bottom 7' which has threaded engagement with the lower end of section 40. This bottom 7' has a concave upper face 8' similar to that shown in the other figures and is provided with a central opening 8'' through which the seed are designed to be fed from the container 1'. A vertical partition 9' depends from the bottom 7' into the discharge member 6' as is clearly shown in Figs. 6 and 7. The opening 8'' communicates with a recess 44 in which is revolubly mounted a seed distributing disk 12'. This disk 12' is of a thickness corresponding to the depth of the recess 44 and is provided with a plurality of spaced peripheral seed receiving pockets 11' which also register when the disk is in operative position with the opening 8'' and are designed to receive the seed fed through said opening and to distribute them through the opening 45 formed in the partition 9' as is shown clearly in Fig. 7.

A ratchet 15' is fixed to the outer face of the disk 12' being preferably cast integral therewith and is designed to be engaged by a pawl 16' carried by an arm 17' which projects laterally from the outer face of the member 6' as is shown clearly in Fig. 5. This arm 17' as shown is mounted on a pivotal section 18' of the cone-shaped earth penetrating member 6' as is shown clearly in Fig. 5. This section 18' which corresponds to the section 18 of the other figures is designed for discharging the seed dropped from disk 12' and is pivotally mounted at its upper end as shown at 19' and is designed to be opened on the upward raising of arm 17' which is accomplished by means of a rod 20' connected with said arm at one end and at its other end is engaged with a pivotally mounted thumb lever 46. This rod is composed of two sections, the upper section 47 being engaged with the lever 46 and the lower section 48 with the arm 17'. These rod sections are adjustably connected by means of an eye 49 formed in the lower end of section 47 through which section 48 extends and the upper end of said section 48 is provided with a device 50 which may be of any desired construction for locking the two rod sections together after the container sections have been adjusted so that the rod may operate as a unitary structure by actuation of the finger grip or lever 46. A coiled spring 23' is carried by the rod section 48 between a lower face of the eye 49' carried by section 40 and a collar 24' which is adjustably mounted on the rod and exerts its tension to force said rod downwardly against arm 17' for closing section 18' of the planter.

The pivoted discharge section 18' of the inverted cone-shaped earth penetrating and seed distributing member extends around about one-half of said member and underlaps the stationary or fixed section as is shown clearly by dotted lines in Fig. 5 so that when said section is opened under the action of the raising of rod 20', the earth will not cave in and clog the member and prevent this pivoted section 18' from properly closing. It is of course understood that the less distance this member opens the better, in order to avoid such clogging.

Means are provided for regulating the depth which the cone-shaped member 6' is to be inserted in the ground and is here shown in the form of an L-shaped stop as 26' similar to the stop 26 which is employed in the other figures and is adjustably mounted in the slot 27' formed longitudinally in the wall of the member 6'. The stop 26' is constructed and operates in the same manner that the stop 26 of the other figures does and may be adjusted to any desired position to provide for a greater or less insertion of the point of the penetrating member 6' so that the seed may be planted at a greater or less depth according to the will of the operator, and the size of the seed to be planted.

The disk 12' above referred to is held in position in the opening or recess 44 by a spring 14' secured at one end to the lower face of the horizontal partition or bottom 7' and the free end of which bears against the outer face of the ratchet 15' as is shown clearly in Fig. 6 and yieldably holds said disk in operative position. It will thus be seen that this disk is detachably mounted in the recess and may be quickly removed when desired and another disk substituted which is desirable when seeds of different sizes are to be planted.

The operation of this seeder is the same as that shown in Figs. 1 to 3, the principal difference between the two forms being that the container 1' is made of telescoping sections to provide for lengthening or shortening of the container and the penetrating member 6' is connected with the bottom 7' in a different manner from that shown in the first mentioned figures. In this latter form also, the partition 9' extends entirely across the member 6' and the disk 12' is mounted therein in a slightly different manner but the same object will be accomplished and in a very similar way.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A hand seeder comprising a seed receptacle having a seed distributing and earth penetrating member carried by its lower end, a horizontal partition disposed between said receptacle and said distributer and having an opening, a revoluble seed distributing disk supported below said partition with its periphery positioned to aline with the opening therein, said disk having a plurality of peripherally arranged pockets, a spring finger depending from said horizontal partition and frictionally engaging one face of said disk, and means under the control of the operator for rotating said disk.

2. A hand seeder comprising a seed receptacle having a seed distributing and earth penetrating member carried by its lower end, a horizontal partition disposed between said receptacle and said distributer and having an opening, a revoluble seed distributing disk supported below said partition with its periphery positioned to aline with the opening therein, said disk having a plurality of peripherally arranged pockets, a spring finger depending from said horizontal partition and frictionally engaging one face of said disk, said distributing member having a pivoted section adapted to open outwardly, and spring returned means under the control of the operator for simultaneously opening said section and turning said disk.

3. A hand seeder comprising a seed receptacle having an inverted cone-shaped seed distributing and earth pentrating member carried by its lower end, a horizontal partition disposed between said container and said distributer and having a concave upper face terminating in a central opening, a vertically disposed partition depending from said horizontal partition and extending transversely across said distributer, said vertical partition having a circular opening therein, a conduit connecting the opening in said horizontal partition with the opening in said vertical partition, a seed distributing disk revolubly mounted in the opening of said vertical partition and having a plurality of peripherally arranged pockets positioned to register with said conduits on the turning of said disk, a spring finger depending from said horizontal partition and frictionally engaging one face of said disk, said cone-shaped distributing member having a pivoted section adapted to open outwardly, and means under the control of the operator for simultaneously opening said section and rotating said disk.

4. A hand seeder comprising a seed receptacle having an inverted cone-shaped seed distributing and earth penetrating member carried by its lower end, a horizontal partition disposed between said container and said distributer and having a concave upper face terminating in a central opening, a vertically disposed partition depending from said horizontal partition and extending transversely across said distributer, said vertical partition having a circular opening therein, a conduit connecting the opening in said horizontal partition with the opening in said vertical partition, a seed distributing disk revolubly mounted in the opening of said vertical partition and having a plurality of peripherally arranged pockets positioned to register with said conduits on the turning of said disk, a spring finger depending from said horizontal partition and frictionally engaging one face of said disk, said cone-shaped distributing member having a pivoted section adapted to open outwardly, and spring returned means under the control of the operator for simultaneously opening said section and turning said disk.

5. A hand seeder comprising a seed receptacle having an inverted cone-shaped seed distributing and earth penetrating member carried by its lower end, a horizontal partition disposed between said container and said distributer and having a concave upper face terminating in a central opening, a vertically disposed partition depending from said horizontal partition and extending transversely across said distributer, said vertical partition having a circular opening therein, a conduit connecting the opening in said horizontal partition with the opening in said vertical partition, a seed distributing disk revolubly mounted in the opening of said vertical partition and having a plurality of peripherally arranged pockets positioned to register with said conduits on the turning of said disk, a spring finger depending from said horizontal partition and frictionally engaging one face of said disk, said cone-shaped distributing member having a pivoted section adapted to open outwardly, a pawl carried by said pivoted section, a ratchet on said disk for engagement by said pawl, and a vertically movable rod connected to open said section and actuate said pawl for turning said disk a predetermined distance.

In testimony whereof I affix my signature in presence of two witnesses.

FRED MARTINSON.

Witnesses:
WALLACE E. DOUGLAS,
OSCAR LUND.

Copies of this patent may be obtained for five cents each, by addressing the "Commissioner of Patents, Washington, D. C."